(12) United States Patent
Lewis, II et al.

(10) Patent No.: US 12,277,484 B2
(45) Date of Patent: Apr. 15, 2025

(54) SYSTEMS AND METHODS FOR CUSTOMIZING USER INTERFACES USING ARTIFICIAL INTELLIGENCE

(71) Applicant: Citibank, N.A., New York, NY (US)

(72) Inventors: Kirk M. Lewis, II, New York, NY (US); Shahzad Din, New York, NY (US); Aarvi Thadeshwar, New York, NY (US); Christopher James Byrne, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/671,694

(22) Filed: May 22, 2024

(65) Prior Publication Data

US 2025/0005449 A1    Jan. 2, 2025

Related U.S. Application Data

(63) Continuation of application No. 18/520,204, filed on Nov. 27, 2023, now Pat. No. 12,026,599, which is a continuation-in-part of application No. 18/478,964, filed on Sep. 29, 2023, which is a continuation of application No. 18/345,705, filed on Jun. 30, 2023, now Pat. No. 11,797,892.

(51) Int. Cl.
  *G06N 20/00*   (2019.01)
  *G06F 3/0481*  (2022.01)
  *G06F 9/451*   (2018.01)

(52) U.S. Cl.
  CPC ........... *G06N 20/00* (2019.01); *G06F 3/0481* (2013.01); *G06F 9/451* (2018.02)

(58) Field of Classification Search
  CPC ..... G06N 20/00; H04L 41/22; G06F 3/04842; G06F 9/44505
  See application file for complete search history.

(56) References Cited

U.S. PATENT DOCUMENTS

| | | | |
|---|---|---|---|
| 11,520,947 B1 * | 12/2022 | Serackis | G06F 9/451 |
| 12,026,599 B1 * | 7/2024 | Lewis, II | G06F 3/0481 |
| 2016/0062603 A1 * | 3/2016 | Halbedel | G06N 20/00 715/762 |
| 2017/0262164 A1 * | 9/2017 | Jain | G06F 3/04847 |
| 2020/0387823 A1 * | 12/2020 | Yao | G06F 3/0481 |
| 2023/0045909 A1 | 2/2023 | Eldridge et al. | |

OTHER PUBLICATIONS

International Search Report and Written Opinion issued in International Application No. PCT/US2024/044657 on Dec. 20, 2024 (10 pages).

* cited by examiner

*Primary Examiner* — Soe Hlaing
(74) *Attorney, Agent, or Firm* — Perkins Coie LLP

(57) ABSTRACT

Systems and methods are described herein for novel uses and/or improvements for designing user-specific interfaces using machine learning models. When a request to display certain data by an application is received, an application token and a user token may be retrieved and input into a machine learning model to obtain a prediction of a predefined user-application interface configuration. A user interface token for the application may then be generated. The user interface token may indicate user interface settings/configuration desired/preferred by a user. The user interface token may then be sent to the application to cause the application to display the data using user interface configurations within the user interface token.

20 Claims, 10 Drawing Sheets

200

| 203 | 206 | 209 |
| --- | --- | --- |
| Font color | Background Color | Font Size |
| Blue | White | 12 |

220

| 223 | 226 | 229 |
| --- | --- | --- |
| Interface Element 1 | Interface Element 2 | Interface Element 3 |
| <Vector> | | |

| Font Size | Font Color | Background Color | Font Name |
|---|---|---|---|
| 12 | #0000FF | #FFFFFF | Times New Roman |

SYSTEMS AND METHODS FOR CUSTOMIZING USER INTERFACES USING ARTIFICIAL INTELLIGENCE

CROSS-REFERENCE TO RELATED APPLICATION(S)

This application is a continuation of U.S. patent application Ser. No. 18/520,204, filed Nov. 27, 2023, which is a continuation-in-part of U.S. patent application Ser. No. 18/478,964, filed Sep. 29, 2023, which is a continuation of U.S. patent application Ser. No. 18/345,705, filed Jun. 30, 2023. The content of the foregoing applications is incorporated herein in its entirety by reference.

BACKGROUND

User interface development has been an important branch of computer science for many years. Engineers have been developing user interfaces that enable easy consumption of visual and audio information. In recent years, engineers have been developing interfaces that are more and more flexible, enabling users to customize many interface settings so that users are able to digest information in the best and most efficient way possible. However, as user interfaces become more and more complex, it is very difficult and time consuming for a user to find and configure each user interface for each and every application that the user may use. In addition, in recent years the use of artificial intelligence, including but not limited to machine learning, deep learning, etc. (referred to collectively herein as artificial intelligence), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Thus, it may be desirable to use artificial intelligence (e.g., machine learning) to design user interfaces that are user-specific and that will help each user digest application data in a more efficient manner.

SUMMARY

Accordingly, systems and methods are described herein for designing user-specific interfaces using machine learning models. An interface configuration system may be used to perform operations for designing user-specific interfaces. In many instances, users may be interacting with a user device (e.g., a smartphone, an electronic tablet, or another suitable user device). Furthermore, an ability to interact with wearable devices, such as virtual reality devices, augmented reality (AR) devices (e.g., AR glasses), smart watches provide an opportunity for the user to have environmental and biological data collected as well as intellectual and preferential data for further analysis. The interface configuration system may reside (at least partially) on that device and perform operations described below.

The interface configuration system may receive a request to display application data to a user. The request may include an application token with a multitude of interface configurations for the application. For example, a user may launch a particular application on the user device. When the application is launched, the interface configuration system may receive an application token that stores various user interface configurations for the application (e.g., a default configuration including colors, fonts, etc.). In some embodiments, the application token may include the plurality of interface configurations encoded into a vector space of a machine learning model. Furthermore, the application token may include one or more rules indicating which application configurations are available for update and which are not. Furthermore, the application token may include a number of rules indicating which configuration settings should be linked to other configuration settings. For example, a text color setting may be linked to a background color setting.

The interface configuration system may also use a user token for interface configuration. Thus, the interface configuration system may retrieve a user token associated with the user. The user token may include a multitude of user configurations generated based on user interface data received from a plurality of sources. In some embodiments, the user token may include the user interface data encoded into the vector space of the machine learning model. For example, the user token may include user preferences for text size, text color, background color, etc. In some embodiments, the user token may include user preference and historical preference information. In another example, the user preference information may include interface preferences from other applications. Historical preference information may include information regarding interface settings or configurations that the user changed in the past. In some embodiments, the user token may include environmental and temporal information. For example, the user token may include user location, time of day, weather data (e.g., temperature, rain/snow, wind), and/or other suitable environmental information. In some embodiments, the interface configuration system may collect the environmental information in response to receiving the request.

Once the two tokens are available (the application token and the user token), the interface configuration system may combine the information within those tokens. In particular, the interface configuration system may merge the application token and the user token into a consolidated token. The consolidated token may include a first subset of the user interface data and a second subset of the interface configurations. For example, the interface configuration system may select from the user token those user configurations that can be updated within the interface configurations. In particular, if the background color is not configurable, the interface configuration system may not select that user configuration. In some embodiments, the interface configuration system may generate data for the consolidated token based on the rules within the interface configurations.

The interface configuration system may then use artificial intelligence to generate a user interface token for the request. Thus, interface configuration system may input the consolidated token into a machine learning model to obtain a user interface token. The machine learning model may have been trained to generate user interface tokens that include unique user-application interface configurations. For example, the machine learning model may have been trained using user data for a multitude of users (e.g., one thousand, one hundred thousand, one million, etc.). In particular, the machine learning model may be trained for predicting a text color based on data within the user interface token.

When the user interface token is generated, the interface configuration system may use the user interface token to cause the application to configure its own user interface. Thus, the interface configuration system may send a command to the application to display the application data in a user interface using the user interface token. That is, the command may cause the application to initialize a user interface with the unique user-application interface configuration. For example, the command may cause the application to overwrite its own user interface settings with the settings provided in the user interface token.

In some embodiments, the interface configuration system may generate an application token for a particular application based on user interface settings for that application that may be modified. The interface configuration system may send a request to the application for the interface settings that may be modified, and when the response is received, the interface configuration system may encode the response into a vector space of the machine learning model.

In some embodiments, the interface configuration system may generate a user token using another machine learning model. For example, the interface configuration system may collect environmental data (e.g., date, time, temperature, weather, etc.) in addition to user historical data and input that information into a specialized machine learning model to get an output of settings preferred by the user. The output may then be converted/transformed into a user token.

In some embodiments, the interface configuration system may classify a particular user into a pre-defined user interface of a set of pre-defined user interfaces. For example, some pre-defined user interfaces may be user-based, while other pre-defined user interfaces may be application-based. In some embodiments, the interface configuration system may receive a request to display application data to a user. For example, a user may launch a particular application on the user device. When the application is launched, a client device (e.g., a user's smartphone) may transmit the request to the interface configuration system, which may receive the request from the application (e.g., on the client device) to display application data. In some embodiments, the request may include various information such as an application name, an application identifier, and/or other data.

The interface configuration system may use a user token for generating an interface configuration to display the application data. The interface configuration system may retrieve a user token associated with the user. The user token may include a plurality of user configurations generated based on user interface data received from a plurality of sources. For example, the user token may include user preferences for text size, text color, background color, etc. As discussed above, the user token may include user preference and historical preference information. In some embodiments, the user preference information may include interface preferences from other applications. Historical preference information may include information regarding interface settings that the user changed in the past. In some embodiments, the user token may include environmental and temporal information. For example, the user token may include user location, time of day, weather data (e.g., temperature, rain/snow, wind), and/or other suitable environmental information. In some embodiments, the interface configuration system may collect the environmental information in response to receiving the request.

In some embodiments, the interface configuration system may decode the user token into a plurality of user interface settings. For example, the user token may be encoded into a format that specifies various user interface settings preferred by the user. However, a particular application may not support changes to all those settings. Accordingly, the user interface system may decode the user token in such a way that the user interface settings that are available within the application are separated from other settings that may not be available.

The interface configuration system may then use artificial intelligence to classify the user's interface preference based on the user token into one pre-defined user interface. Thus, the interface configuration system may input the plurality of user interface settings into a machine learning model to obtain a unique user-application interface configuration. The machine learning model may have been trained to generate a corresponding unique user-application interface configuration of a plurality of unique user-application interface configurations based on a corresponding plurality of user interface settings. For example, the machine learning model may have been trained using user data for a multitude of users (e.g., one thousand, one hundred thousand, one million, etc.) to classify a new user into a particular pre-defined user interface. In particular, the machine learning model may be trained for predicting a user interface that the user prefers based on the data within the user token. Thus, the interface configuration system may have access to a multitude of unique interface configurations that have been pre-created. Accordingly, the machine learning model may output, based on information within the user token, the most probable user interface that the user prefers. Thus, the plurality of unique user-application interface configurations may include a plurality of pre-defined configurations.

In some embodiments, the interface configuration system may generate a user interface token from the unique user-application interface configuration. In particular, the interface configuration system may encode, based on a template of a plurality of templates, the unique user-application interface configuration into a user interface token. The template may be associated with a pre-defined configuration of the plurality of pre-defined configurations. For example, when the interface configuration system receives a particular unique user-application interface configuration from the machine learning model, the interface configuration system may retrieve the parameters of the unique user-application interface configuration. The parameters may include font color, text size, background color, display complexity, text density, and/or other suitable parameters. The interface configuration system may then retrieve a template that is compatible with the application associated with the original request and may then add the parameters to the template to generate a user interface token.

When the user interface token is generated, the interface configuration system may use the user interface token to cause the application to configure its own user interface. Thus, the interface configuration system may send a command to the application to display the application data in a user interface using the user interface token. That is, the command may cause the application to initialize a user interface with the unique user-application interface configuration. For example, the command may cause the application to overwrite its own user interface settings with the settings provided in the user interface token.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates excerpts of data structures for storing an application token, in accordance with one or more embodiments.

FIG. 3 illustrates a data structure with an example set of fields and corresponding values, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
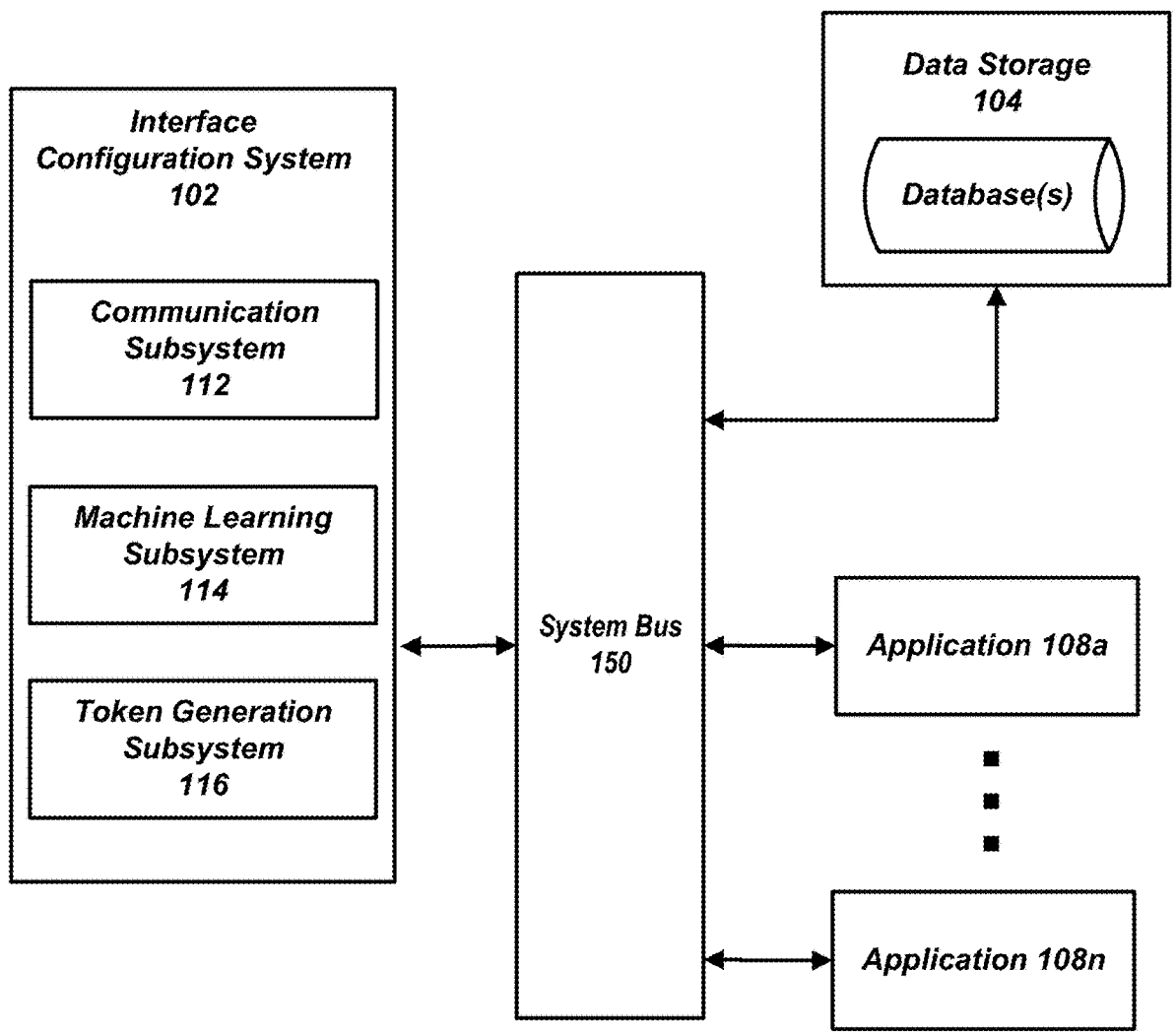
FIG. 1 shows an illustrative system for providing user interfaces using artificial intelligence, in accordance with one or more embodiments.

FIG. 1 is an example of environment 100 for providing user interfaces using artificial intelligence. Environment 100 may be hosted on a user computing device, on a server, or another suitable computing device. As referred to herein, the term "user interface" refers to the point of human-computer interaction and communication in a device. This may include display screens, audio output devices, and the appearance of a desktop. One example of a user interface is a graphical user interface enabling a computing device to display information to a user. Another example of a user interface is an audio interface enabling a user to hear information from a computing device.

Environment 100 includes interface configuration system 102, data storage 104, and applications 108a-108n. Interface configuration system 102 may execute instructions for providing user interfaces using artificial intelligence. Interface configuration system 102 may include software, hardware, or a combination of the two. For example, interface configuration system 102 may reside on a physical server or a virtual server that is running on a physical computer system. In some embodiments, interface configuration system 102 may be configured on a user device (e.g., a laptop computer, a smartphone, a desktop computer, an electronic tablet, or another suitable user device).

Data storage 104 may store various data, including one or more machine learning models, training data, user tokens, application tokens, and/or other suitable data. Data storage 104 may include a combination of hardware (e.g., memory and/or disk) and software (e.g., for reading/writing data to the hardware). System bus 150 may be a logical or a physical system bus connecting components of the system (e.g., interface configuration system 102, data storage 104, and applications 108a-108n). Applications 108a-108n may be end-user applications residing, at least partially, on a client device (e.g., desktop computers, laptops, electronic tablets, smartphones, and/or other computing devices used by end users).

Interface configuration system 102 may receive a request to display application data to a user of an application. As referred to herein the term "application" may refer to a program being executed on a user device. As referred to herein, the term "application data" should be understood to mean an electronically consumable data (e.g., consumed by the user), such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same.

In some embodiments, the request may include an application token, such that the application token includes a plurality of interface configurations for the application. As referred to herein, the term "interface configuration" refers to a setting with an application that enables changing a user interface (e.g., a graphical user interface). Interface configuration and interface setting may be used interchangeably throughout this disclosure. For example, an interface configuration may include a color of text, a color of the background, a text font, and/or other settings. The application token may be encoded into the request. In some embodiments, the request may include a link to the application token or an address in memory where the application token may be accessed. Interface configuration system 102 may receive the request via communication subsystem 112. Communication subsystem 112 may include software components, hardware components, or a combination of both. For example, communication subsystem 112 may include software that is enabled to communicate via a system bus (e.g., system bus 150).

In some embodiments, communication subsystem 112 may receive the request from an application of applications 108a-108n. In some embodiments, applications 108a-108n may be applications being hosted on a client device that includes user interface components (e.g., graphical user interface components, audio interface components, etc.). Applications 108a-108n may include an email application, a text editing application, a social media application, an image editing application, and/or other suitable applications. Communication subsystem 112 may pass the request, or a pointer to the request in memory, to machine learning subsystem 114. Machine learning subsystem 114 may include software components, hardware components, or a combination of both. For example, machine learning subsystem 114 may include software components (e.g., API calls) that access one or more machine learning models.

In some embodiments, the request may be generated by an application in response to a user launching that application on the client device. For example, the user may have used a touch interface on a client device to launch an application. Upon launch, the application may generate the request and send the request to interface configuration system 102 through communication subsystem 112 (e.g., via an application programming interface (API) call). The application may have access to its own application token (e.g., residing in data storage 104). Thus, the application may retrieve the application token and add the application token to the request. In some embodiments, the generation of the request may be triggered by new data being received by the application. For example, the application may receive a new data stream to display to the user. In response to receiving the new data stream, the application may generate a request to interface configuration system 102 to display the data stream.

In some embodiments, the application token may be a data structure storing a plurality of interface configurations for the application. FIG. 2 illustrates excerpts of data structures for storing an application token. Excerpt of data structure 200 illustrates the application token storing various user interface configurations for a particular application that may be modified by a user. In some embodiments, data structure 200 may store all user interface configurations and may indicate which user interface configurations may be modified. In particular, data structure 200 includes field 203, field 206, and field 209 with corresponding field values.

In some embodiments, the application token may include the plurality of interface configurations encoded into a vector space of a machine learning model. Data structure 220 of FIG. 2 illustrates an excerpt of such a data structure. Data structure 220 may include field 223, field 226, and field 229 representing different interface elements that are encoded into a vector 232. In some embodiments, data structure 220 may store all fields that have values encoded into vector 232. For example, the application may have 30 different interface configurations that may be changed. Accordingly, data structure 220 may include fields for the 30 different configurations and a field for the vector. In some embodiments, data structure 220 may include a plurality of vectors such that each vector corresponds to a subset of fields representing a subset of configurations that may be modified. Thus, each field may be assigned a category of user interface configurations and each vector may be generated for a particular category having one or more fields.

In some embodiments, interface configuration system 102 may generate application tokens for different applications prior to those application tokens being used. Interface configuration system 102 may perform those operations using token generation subsystem 116. Token generation subsystem 116 may include software components, hardware components, or a combination of both. Token generation subsystem 116 may generate application tokens, user tokens, and/or other suitable tokens.

In some embodiments, to generate a particular application token, token generation subsystem 116 may perform the following operations. Token generation subsystem 116 may generate a settings request for the application. The settings request may request the plurality of interface configurations from the application. For example, each application may store a listing of configuration settings that may be enabled to modify one or more interface configurations for the application. In some embodiments, the settings may be stored as a template of all available settings to update one or more interface configurations with each setting including a flag that indicates whether the setting may be modified. When the application receives the settings request, the application may send back to the requestor the plurality of interface configurations. In some embodiments, the interface configurations may be stored outside of the application (e.g., in data storage 104). Thus, token generation subsystem 116 may request the interface configurations from that storage location.

Token generation subsystem 116 may receive, in response to the settings request, the plurality of interface configurations from the application. For example, token generation subsystem 116 may receive a data structure (e.g., a template) with interface configurations. The data structure may be, for example, an XML file or another suitable data structure. In some embodiments, the data may be clear text (e.g., as shown with the excerpt of data structure 200 of FIG. 2). In some embodiments, the data structure may include a listing of both interface configurations that may be modified and interface configurations that may not be modified. The data structure may also include indicators (e.g., flags) indicating whether each specific interface configuration may be modified and indicating those which may not be modified.

When token generation subsystem 116 receives the interface configurations, machine learning subsystem 114 may generate an encoding for those interface configurations. In particular, token generation subsystem 116 may encode the plurality of interface configurations into a vector within a vector space of a machine learning model. Token generation subsystem 116 may use one of a variety of encoding techniques available for the encoding. For example, token generation subsystem 116 may use text2vec or another suitable vector encoder. In some embodiments, the encoding technique may involve a specialized machine learning model built for encoding interface configurations. That is, token generation subsystem 116 may input the plurality of interface configurations into a specialized machine learning model and receive the vector that is made up of the encoded interface configurations.

When the encoding process generates the vector, token generation subsystem 116 may generate the application token from the vector. For example, the application token may include a vector and metadata identifying the application associated with the application token. In some embodiments, other metadata may be added to the application token (e.g., creation date/time, expiration date/time, permissions, and/or other suitable metadata). For example, the permissions may be associated with one or more mobile devices (e.g., smartphones) and/or one or more users. That is, the application token may be used by one or more mobile devices and one or more users indicated by the permissions.

In some embodiments, token generation subsystem 116 may encode the interface configurations as described below. That is, token generation subsystem 116 may encode the plurality of interface configurations into the vector within the vector space of the machine learning model. Token generation subsystem 116 may retrieve a plurality of fields corresponding to available interface configurations. For example, the application may be associated with interface configurations that are modifiable and interface configurations that are not modifiable. Each interface configuration may be associated with a name and or type. Thus, token generation subsystem 116 may take into account the different fields that are not modifiable when generating the vector.

Token generation subsystem 116 may match each interface configuration of the plurality of interface configurations to a corresponding field of the plurality of fields. For example, a data structure may include all the interface configuration fields (e.g., both modifiable and non-modifiable). Token generation subsystem 116 may add values to the modifiable fields and may add default values or indicators of unmodifiable fields as values to the fields that are not modifiable. In some embodiments, one or more fields may include a range of values that may be assigned to those fields. For example, a font size field may have a range of values as if the font is too big, the user interface for the application will not be correctly displayed. In addition, if the font size is too small, a user may not be able to read the information because the text may be too small. In another example, the owners of the application may desire that only certain colors may be used as background colors. Thus, a background color field may include one or more identifiers of background colors that may be placed.

Token generation subsystem 116 may then encode each matching interface configuration into the vector according to the plurality of fields. Token generation subsystem 116 may add predetermined values to fields that are not modifiable. For example, token generation subsystem 116 may input a data structure storing modifiable values and unmodifiable values into a specialized machine learning model that may perform the encoding operation. As discussed above, various encoding techniques may be used by the machine learning model (e.g., text2vec).

In some embodiments, the application token may be a data structure that includes a plurality of fields that are modifiable (e.g., a template). The template may include names of all the modifiable fields. The modifiable fields may include default values or may be empty. Those modifiable fields may later be filled in as will be discussed below.

In addition to using an application token, interface configuration system 102 may use a user token. Thus, machine learning subsystem 114 may retrieve a user token associated with the user. The user token may include a plurality of user configurations generated based on user interface data received from a plurality of sources. The user token may be a data structure that includes various user interface configurations generated for the user. The data structure may store user interface configurations as name-value pairs. The names of the values may correspond to one or more fields within the application token.

In some embodiments, token generation subsystem 116 may generate the user token. Token generation subsystem 116 may query different sources for data to be used in generating the user token. For example, token generation subsystem 116 may query the user device for date/time, current location, current temperature at the user's location and or other temporal data. As referred to herein, the term temporal data indicates data that is collected at the time of the request. Furthermore, token generation subsystem 116 may retrieve other user interface preference data associated with the user to be used in generating the user token. Token generation subsystem 116 may then use a token generation machine learning model to generate a user token.

In some embodiments, token generation subsystem 116 may use the following operations to train a machine learning model for generating a user token and then use that machine learning model to generate the user token for a particular user. Token generation subsystem 116 may receive a first plurality of sets of user interface settings for a plurality of applications. Each set of the first plurality of sets may have been configured by a corresponding user of a plurality of users. For example, token generation subsystem 116 may receive various interface configurations associated with different applications. Those interface configurations may have been configured by different users. For example, interface configurations may include font size, font color, background color, formatting settings, and/or other suitable interface configurations.

Token generation subsystem 116 may also determine a plurality of environmental conditions associated with each set of user interface settings. The plurality of environmental conditions may include time of day, user location, and temperature at the user location at the time of day and/or other environmental conditions. In some embodiments, the environmental conditions may correspond to the time when the user completed or started the associated interface configuration. For example, token generation subsystem 116 may retrieve a corresponding timestamp associated with each set of interface settings together with a location. Based on the time and location, token generation subsystem 116 may determine a temperature at that location at that time. Token generation subsystem 116 may determine other environmental conditions based on location and time (e.g., whether it rained and/or other weather conditions).

Token generation subsystem 116 may also retrieve a second plurality of sets of user characteristics. Each set of user characteristics may be associated with the corresponding user of the plurality of users. For example, for each set of user interface settings, token generation subsystem 116 may retrieve or determine user characteristics for the corresponding user. Those characteristics may include demographics (e.g., age, gender, etc.) and/or other characteristics such as vocation, salary, etc. The second plurality of characteristics may be retrieved from a remote database storing user data.

Token generation subsystem 116 may then generate a training dataset that includes the first plurality of sets of the user interface settings, the plurality of environmental conditions, and the second plurality of sets of the user characteristics. For example, the training dataset may have a plurality of rows and columns. Each column may be a feature (e.g., a user characteristic, an environmental condition such as temperature, or an interface setting). Each row may correspond to a user that configured the associated interface settings together with corresponding user characteristics. The interface settings may be tagged as target columns for a training algorithm of a machine learning model.

Token generation subsystem 116 may then input the training dataset into a training routine of a user token generation machine learning model to train the user token generation machine learning model to output user tokens. Each user token may correspond to a matching plurality of sets of user interface settings. For example, the user token generation machine learning model may be trained to generate interface settings that are preferred/desired by a user based on the user characteristics and environmental conditions. In some embodiments, the user token generation machine learning model may be trained to output a plurality of user configurations for a particular user.

Based on training the user token generation machine learning model, machine learning subsystem 114 may generate a user token for the user. Machine learning subsystem 114 may use the following operations when generating the user token. Before generating a user token, machine learning subsystem 114 may determine whether the user already has a user token. Thus, machine learning subsystem 114 may retrieve a user identifier of the user. A user identifier may include letters, numbers, and/or other characters. Machine learning subsystem 114 may retrieve the user identifier from an application, from data storage 104 or from another suitable location.

Machine learning subsystem 114 may determine, based on the user identifier, that the user token for the user has not been generated yet. For example, machine learning subsystem 114 may query a database that stores user identifiers and corresponding user tokens. The query may include the user identifier and may request the associated user token. Based on the response from the database that the corresponding user token does not exist, machine learning subsystem 114 may determine that the user token has not been generated yet. In some embodiments, machine learning subsystem 114 may determine that the user token has expired (e.g., based on a timestamp associated with the user token). Thus, each user token may be valid for a particular period of time (e.g., a day, a week, a month, etc.). In some embodiments, the database system may clean up (e.g., delete) expired user tokens. Thus, a user token may not exist when requested by machine learning subsystem 114.

When machine learning subsystem 114 determines that the user token has not been created yet or does not exist, machine learning subsystem 114 may determine a plurality of current environmental conditions and a set of user characteristics for the user. For example, machine learning subsystem 114 may query the user's device for date/time, location, weather, and/or other suitable environmental conditions. In addition, machine learning subsystem 114 may determine (e.g., retrieve) a set of user characteristics for the user of the device. The user characteristics may be stored in data storage 104 and/or another suitable data storage (e.g., on a remote system). The user characteristics may include user demographics (e.g., age, gender, etc.) and/or other suitable characteristics.

Machine learning subsystem 114 may input the plurality of current environmental conditions and the set of user characteristics into the user token generation machine learning model to obtain a corresponding plurality of user interface settings. For example, the user token generation machine learning model may output, for each user configuration, one or more values corresponding to a likelihood that that value is preferred/desired by the user. In some embodiments, the output may include one value per each setting. However, in other embodiments, there may be multiple values for one or more settings.

Machine learning subsystem 114 may generate the user token based on the corresponding plurality of user interface settings. For example, machine learning subsystem 114 may generate a data structure that stores name-value pairs for each interface setting corresponding to each interface configuration.

In some embodiments, machine learning subsystem 114 may use user similarity to generate a new user token. Machine learning subsystem 114 may determine that the user token for the user has not been generated yet. In some embodiments, machine learning subsystem 114 may determine that the user token should be updated or regenerated because that user token has expired. In response, machine learning subsystem 114 may then retrieve a set of user characteristics for the user. As discussed above, the user characteristics may be demographics and/or other user characteristics. Machine learning subsystem 114 may input the user characteristics into a similarity model to identify a similar user within a set of users having corresponding user tokens. For example, machine learning subsystem 114 may have access to a machine learning model that may determine that two users are similar based on their characteristics.

Thus, machine learning subsystem 114 may use other known users for comparison (within the machine learning model) to determine a matching user. In some embodiments, machine learning subsystem 114 may determine that two users are similar to the user and may identify the differences between user tokens of those two users. Based on the differences, machine learning subsystem 114 may blend the values that are different. For example, the values may be averaged. In some embodiments, the values may be selected based on categorical similarities of the two users.

Machine learning subsystem 114 may then generate the user token based on a matching user token associated with the similar user. For example, if machine learning subsystem 114 receives from the similarity model one or more matching users, machine learning subsystem 114 may retrieve a user token associated with a matching user and then create a copy of that user token. In some embodiments, in addition to using user characteristics, machine learning subsystem 114 may use environmental information to identify a matching user. Based on that, machine learning subsystem 114 may generate a user token for the user. In some embodiments, as discussed above, the user token may be a data structure having name-value pairs for user configurations determined to be preferred by the user.

In some embodiments, the user token may include the user interface data encoded into the vector space of the machine learning model. For example, machine learning subsystem 114 may encode the name-value pairs into a vector within the vector space of a machine learning model that will then output a user interface token for the particular application. The encoding may be a reversible encoding which may enable a user device to encode and decode the vector. For example, the user interface data encoded into the vector space of the machine learning model may be decoded back into clear text. That is, the encoding may be reversed.

When machine learning subsystem 114 receives/retrieves the application token and the user token, machine learning subsystem 114 may merge those tokens into a consolidated token for input into a machine learning model. In particular, machine learning subsystem 114 may merge the application token and the user token into a consolidated token. The consolidated token may include a first subset of the user interface data and a second subset of the plurality of interface configurations. In some embodiments, machine learning subsystem 114 may generate the consolidated token by merging the fields for user configurations within the application token, which are modifiable with values in the user token.

In some embodiments, machine learning subsystem 114 may perform the following operations to generate the consolidated token. Machine learning subsystem 114 may iterate through each user interface configuration of the application token to determine a type associated with each user interface configuration. For example, machine learning subsystem 114 may retrieve a type associated with each field within the application token. In some embodiments, the type may be the name of the field. For example, the application token may indicate that there are 20 different user configurations corresponding to 20 different fields. Twelve of the fields may be modifiable and eight fields may not be modifiable. Thus, machine learning subsystem 114 may iterate through all the 20 fields.

Machine learning subsystem 114 may determine, within the user token, a corresponding user configuration that matches each type. For example, as machine learning subsystem 114 iterates through each field of the application token, machine learning subsystem 114 may compare the field type or a field name with field names associated with values within the user token. When machine learning subsystem 114 matches a field within the application token with a value within the user token, machine learning subsystem 114 may add that value as a user interface configuration into the consolidated token. Machine learning subsystem 114 may continue the process for all fields. When machine learning subsystem 114 matches a field that is not modifiable, machine learning subsystem 114 may indicate the match within the consolidated token with a predetermined value. In some embodiments, the application token fields may include default values. Thus, machine learning subsystem 114 may add the default values and the values from the user tokens to the fields. Accordingly, machine learning subsystem 114 may add user interface configurations that have matching user configurations to the consolidated token.

In some embodiments, machine learning subsystem 114 may encode the consolidated token into a vector within a vector space of the machine learning model. In some embodiments, the encoding may only include values for fields that are modifiable. In other embodiments, the encoding may include values for fields that are modifiable and non-modifiable, with non-modifiable fields having a predetermined value. The encoding process may be done using an encoding machine learning model (e.g., text2vec) as discussed above.

Machine learning subsystem 114 may input the consolidated token into a machine learning model to obtain a user interface token. The machine learning model may be trained to generate user interface tokens that include unique user-application interface configurations. The machine learning model may be trained using a training dataset that may include application token data and user token data with one or more target fields corresponding to user interface tokens. Thus, when trained, the machine learning model may output a user interface token that includes a multitude of fields for modifying a user interface of an application to best suit a particular user on a particular device. Accordingly, for each user-application combination, the machine learning model may output a unique user-application interface configuration.

In some embodiments, each unique user-application interface configuration may include a plurality of fields and corresponding values for those fields. The fields may be fields that are modifiable by the application. FIG. 3 illustrates an excerpt of data structure 300 with an example set of fields and corresponding values. Field 303 may store a font size, field 306 may store a font color, field 309 may store a background color, and field 312 may store a font name. Other name-value pairs may be included in the data structure in addition or instead of the included fields.

In some embodiments, machine learning subsystem 114 may perform the following operations when generating unique user-application interface configurations. Machine learning subsystem 114 may receive, from the machine learning model, the user interface token. The user interface token may include an output vector within a vector space of the machine learning model. That is, the output of the machine learning model may be an output vector encoded in the vector space of the machine learning model. The output vector may be encoded using a two-way encoding scheme. Thus, machine learning subsystem 114 may decode the output vector into a plurality of fields storing interface configuration settings. The plurality of fields may correspond to a plurality of types. The decoding operation may re-create the field names from the application and then add the values from the output vector into the fields. In some embodiments, the values may be added to the fields that are modifiable and default values may be added to fields that are not modifiable. Machine learning subsystem 114 may then generate the unique user-application interface configuration from the plurality of fields.

In some embodiments, machine learning subsystem 114 may perform the following operations when generating the unique user-application interface configuration. Machine learning subsystem 114 may retrieve a user interface configuration template of a plurality of user interface configuration templates. The user interface configuration template may be associated with the application. For example, one or more applications on a user device may have corresponding templates for user interface configurations. One example of such a template may be a Cascading Style Sheets (CSS) template. The template may include a plurality of user interface configurations that may be added and/or with default values overwritten based on the output vector received from the machine learning model.

Machine learning subsystem 114 may match, based on the plurality of types, the plurality of fields storing the interface configuration settings with a plurality of template fields to generate the unique user-application interface configuration. For example, machine learning subsystem 114 may iterate through each user interface configuration received from the machine learning model and determine whether there is a matching configuration within the template. Thus, machine learning subsystem 114 may add all the data based on the type of data and/or field names.

Machine learning subsystem 114 may then send a command to the application to display the application data in a user interface using the user interface token. The command may cause the application to initialize the user interface with a unique user-application interface configuration. In some embodiments, the command may include the unique user-application interface configuration in a form of a template as described above. For example, the template may be a CSS template or another type of template. The application may then update its user interface configurations using the template.

In some embodiments, the user may adjust the user interface configurations of an application after those have been applied based on the output of the machine learning model. Interface configuration system 102 may, based on those changes, update the user token. Thus, interface configuration system 102 may receive, from the application, (e.g., via communication subsystem 112) a message indicating that the user updated one or more user interface settings. The message may include indications of the one or more user interface settings that have been updated. In response to the message, interface configuration system 102 may input the one or more user interface settings into a user token generation machine learning model to obtain an updated plurality of user interface settings. For example, interface configuration system 102 may input the updated user interface settings and the user token into the token generation machine learning model and receive, from that machine learning model, an updated set of user interface configurations. Based on the updated plurality of user interface settings, interface configuration system 102 may generate an updated user token.

In some embodiments, the application token may include a hierarchy of settings. Based on the hierarchy of settings in the application token, interface configuration system 102 may update the user token for the application. In particular, interface configuration system 102 may determine that the application token comprises a first hierarchy of settings. The first hierarchy of settings may include a first plurality of levels of detail for the plurality of interface configurations. For example, a first level or layer of settings may include a general setting for a type or a category of settings. In the case of a font color, the first level or layer of settings may indicate that the font color should be red. The second level or layer of settings within the hierarchy may indicate a more detailed setting for that type of category of settings. To continue with the example for a font color, the second level or layer of settings may indicate a font color for the body and a different font color for headings. The third level or layer of settings may indicate even more details for a particular type of setting.

Figure 4:
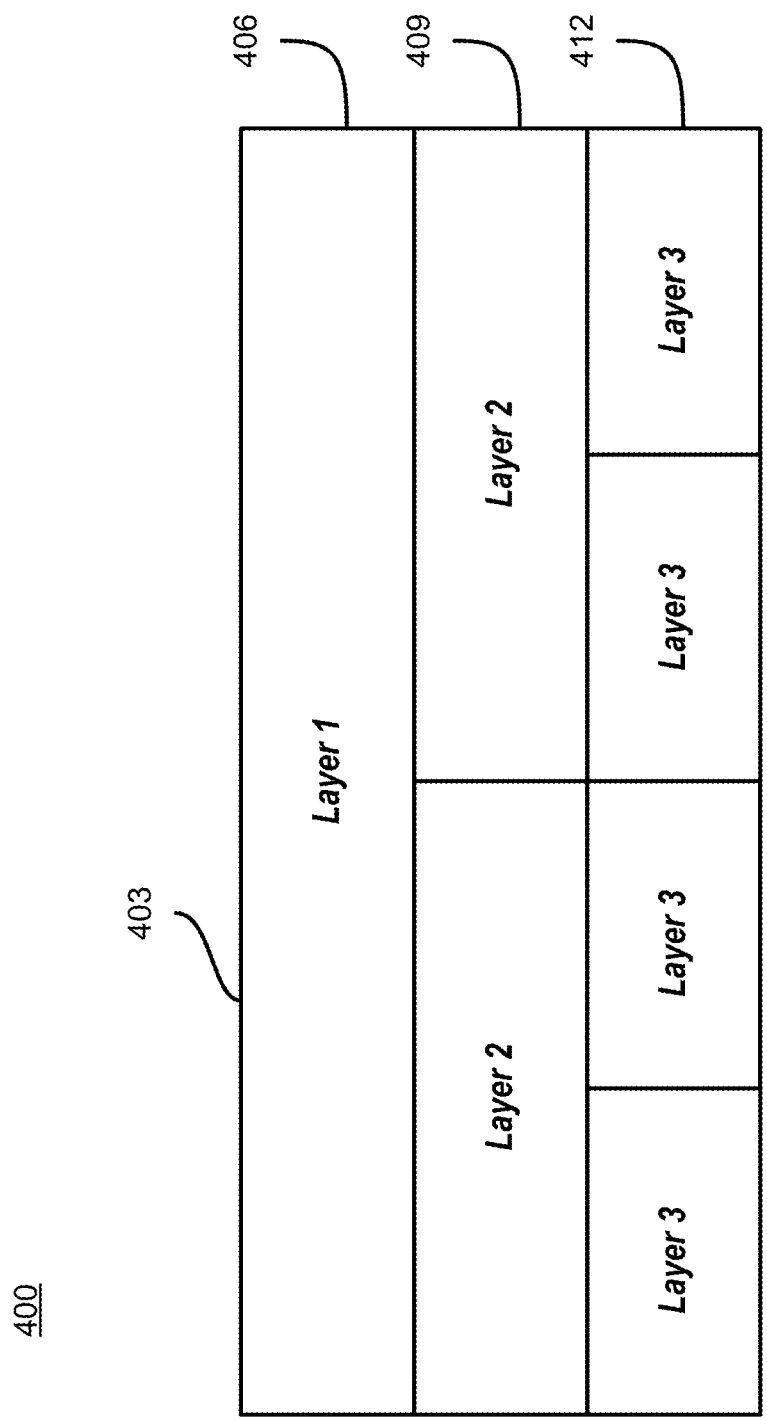
FIG. 4 illustrates an excerpt of an example data structure 400 showing a hierarchy, in accordance with one or more embodiments.

FIG. 4 illustrates an excerpt of an example data structure 400 showing a hierarchy. An example user interface configuration 403 is shown as having three levels or layers. However, a different number of layers or levels may be used. In some embodiments, each user interface configuration may have a different number of layers or levels. Layer 406 may be the first layer and may include one or more of the most generic settings. Layer 409 may be the second layer and may include more settings than layer 406 and may be a less generic layer. Layer 412 may include more settings than layer 409 and may be less generic than both layer 406 and layer 409.

Interface configuration system 102 may determine that the user token comprises a second hierarchy of settings. The second hierarchy of settings may include a second plurality of levels of detail for the plurality of user configurations. Furthermore, the second plurality of levels may include more levels than the first plurality of levels. For example, the application token may include two layers or levels of settings and the user token may include three layers or levels of settings. In some embodiments, interface configuration system 102 may perform the determination for each user interface configuration, as each user interface configuration may have a different number of layers or levels of settings. Interface configuration system 102 may then update the user token to remove one or more levels to match the first plurality of levels of detail. That is, interface configuration system 102 may determine that the application token does not have as deep of a hierarchy as the user token and may merge the application token and the user token in a way that removes the extra layers of hierarchy from the user token. In some embodiments, the application token may have a deeper hierarchy than a user token. In those instances, interface configuration system 102 may fill in the extra level or levels of hierarchy with additional user interface configuration settings. For example, the user token may be regenerated using the user token machine learning model. Interface configuration system 102 may input into the user token generation machine learning model a number of levels required by the application.

Figure 5:
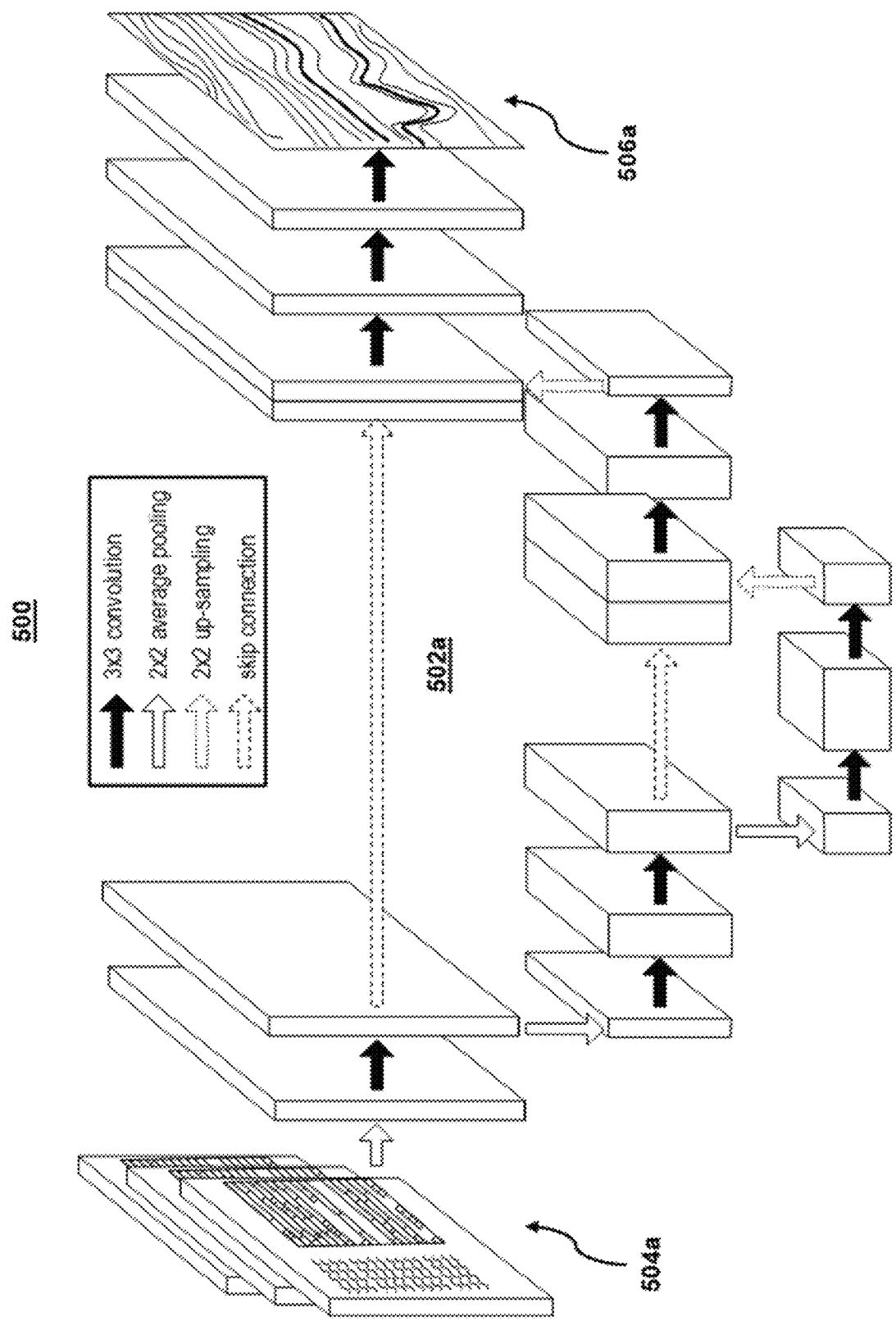
FIG. 5 shows illustrative components for a machine learning model used for providing user interfaces using artificial intelligence, in accordance with one or more embodiments.

FIG. 5 shows illustrative components for a system used for providing user interfaces using artificial intelligence, in accordance with one or more embodiments. System 500 includes model 502a, which may be a machine learning model, artificial intelligence model, etc. (which may be referred to collectively as "models" herein). Model 502a may take inputs 504a and provide outputs 506a. The inputs may include multiple datasets, such as a training dataset and a test dataset. Each of the plurality of datasets (e.g., inputs 504a) may include data subsets related to user data, predicted forecasts and/or errors, and/or actual forecasts and/or errors. In some embodiments, outputs 506a may be fed back to model 502a as input to train model 502a (e.g., alone or in conjunction with user indications of the accuracy of outputs 506a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 502a may update its configurations (e.g., weights, biases, or other parameters) based on the assessment of its prediction (e.g., outputs 506a) and reference feedback information (e.g., user indication of accuracy, reference labels, or other information). In a variety of embodiments, where model 502a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 502a may be trained to generate better predictions.

In some embodiments, the model (e.g., model 502a) may automatically perform actions based on outputs 506a. In some embodiments, the model (e.g., model 502a) may not perform any actions. The output of the model (e.g., model 502a) may be used to generate a user token and/or a user interface token. That is, a generic model 502a may be trained to generate user tokens and may be referred to as a user token generation machine learning model. Another generation model 502a may be trained to generate user interface tokens, as described above.

Figure 6:
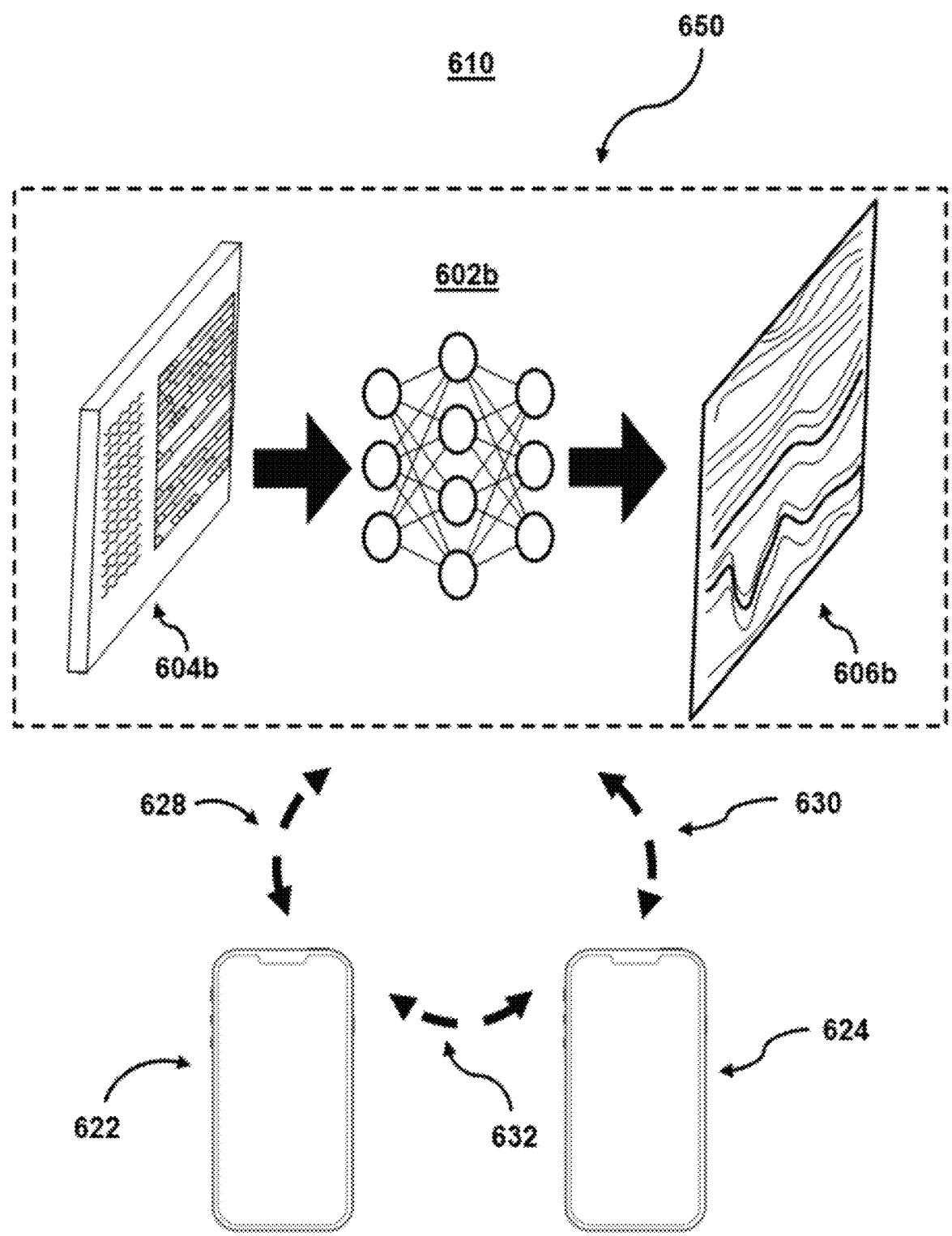
FIG. 6 shows illustrative components for a system used for providing user interfaces using artificial intelligence, in accordance with one or more embodiments.

As shown in FIG. 6, the system may include mobile device 622 and mobile device 624. While shown as smartphones in FIG. 6, it should be noted that mobile device 622 and mobile device 624 may be any computing device, including, but not limited to, a laptop computer, a tablet computer, a handheld computer, and other computer equipment (e.g., a server), including "smart," wireless, wearable, and/or mobile devices. System 600 may also include cloud components. For example, cloud components may be implemented as a cloud computing system and may feature one or more component devices. It should be noted that, while one or more operations are described herein as being performed by particular components of system 600, these operations may, in some embodiments, be performed by other components of system 600. As an example, while one or more operations are described herein as being performed by components of mobile device 622, these operations may, in some embodiments, be performed by cloud components. In some embodiments, the various computers and systems described herein may include one or more computing devices that are programmed to perform the described functions. Additionally, or alternatively, multiple users may interact with system 600 and/or one or more components of system 600.

With respect to the components of mobile device 622 and mobile device 624, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 6, both mobile device 622 and mobile device 624 include a display upon which to display data.

Additionally, as mobile device 622 and mobile device 624 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 600 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 6 also includes communication paths 628, 630, and 632. Communication paths 628, 630, and 632 may include the internet, a mobile phone network, a mobile voice or data network (e.g., a 5G or LTE network), a cable network, a public switched telephone network, or other types of communications networks or combinations of communications networks. Communication paths 628, 630, and 632 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 600 also includes API layer 650. API layer 650 may allow the system to generate summaries across different devices. In some embodiments, API layer 650 may be implemented on mobile device 622 or mobile device 624. Alternatively or additionally, API layer 650 may reside on one or more of cloud components 610. API layer 650 (which may be A REST or Web services API layer) may provide a decoupled interface to data and/or functionality of one or more applications. API layer 650 may provide a common, language-agnostic way of interacting with an application. Web services APIs offer a well-defined contract called WSDL that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 650 may use various architectural arrangements. For example, system 600 may be partially based on API layer 650, such that there is strong adoption of SOAP and RESTful Web services, using resources like Service Repository and Developer Portal, but with low governance, standardization, and separation of concerns. Alternatively, system 600 may be fully based on API layer 650, such that separation of concerns between layers like API layer 650, services, and applications are in place.

In some embodiments, the system architecture may use a microservice approach. Such systems may use two types of layers: Front-End Layer and Back-End Layer where microservices reside. In this kind of architecture, the role of the API layer 650 may provide integration between Front-End and Back-End. In such cases, API layer 650 may use RESTful APIs (exposition to front-end or even communication between microservices). API layer 650 may use AMQP (e.g., Kafka, RabbitMQ, etc.). API layer 650 may use incipient usage of new communications protocols such as gRPC, Thrift, etc.

In some embodiments, the system architecture may use an open API approach. In such cases, API layer 650 may use commercial or open-source API Platforms and their modules. API layer 650 may use a developer portal. API layer 650 may use strong security constraints applying WAF and DDOS protection, and API layer 650 may use RESTful APIs as standard for external integration.

As shown in FIG. 6, in some embodiments, model 602b may be trained by taking inputs 604b and providing outputs 606b. Model 602b may include an artificial neural network. In such embodiments, model 602b may include an input layer and one or more hidden layers. Each neural unit of model 602b may be connected with many other neural units of model 602b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 602b may be self-learning and trained, rather than explicitly programmed, and can perform significantly better in certain areas of problem solving as compared to traditional computer programs. During training, an output layer of model 602b may correspond to a classification of model 602b, and an input known to correspond to that classification may be input into an input layer of model 602b during training. During testing, an input without a known classification may be input into the input layer, and a determined classification may be output.

In some embodiments, model 602b may include multiple layers (e.g., where a signal path traverses from front layers to back layers). In some embodiments, back propagation techniques may be utilized by model 602b where forward stimulation is used to reset weights on the "front" neural units. In some embodiments, stimulation and inhibition for model 602 may be more free-flowing, with connections interacting in a more chaotic and complex fashion. During testing, an output layer of model 602b may indicate whether or not a given input corresponds to a classification of model 602b.

Model 602*b* is shown as a convolutional neural network. A convolutional neural network consists of an input layer (e.g., input 604*b*), hidden layers, and an output layer (e.g., output 606*b*). As shown in FIG. 6, the middle layers are called hidden because their inputs and outputs are masked by the activation function and final convolution. In a convolutional neural network, the hidden layers include layers that perform convolutions. Model 602*b* may comprise convolutional layers that convolve the input and pass its result to the next layer. Model 602*b* includes local and/or global pooling layers along with traditional convolutional layers. Pooling layers reduce the dimensions of data by combining the outputs of neuron clusters at one layer into a single neuron in the next layer. Also as shown, model 602*b* may comprise fully connected layers that connect every neuron in one layer to every neuron in another layer.

Figure 7:
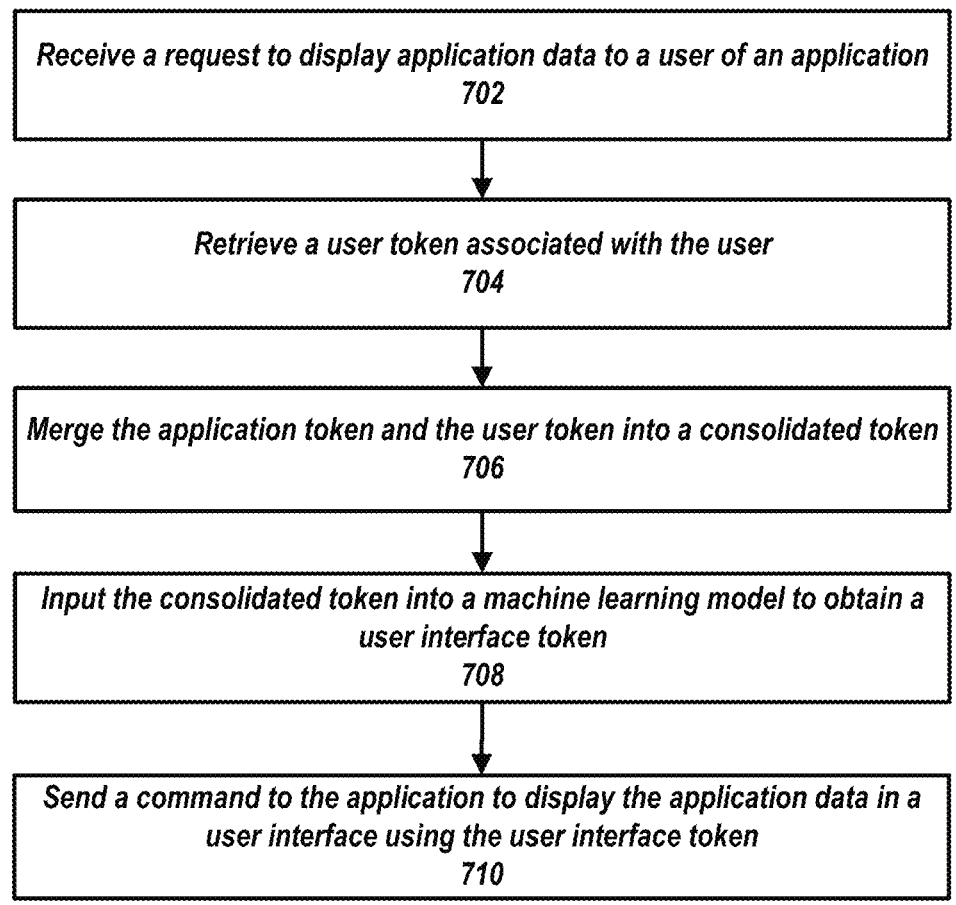
FIG. 7 shows a flowchart of the steps for providing user interfaces using artificial intelligence, in accordance with one or more embodiments.

FIG. 7 shows a flowchart of the steps for providing user interfaces using artificial intelligence. For example, the system may use process 700 (e.g., as implemented on one or more system components described above (e.g., in FIGS. 1 and 6)) in order to provide user interfaces using artificial intelligence. The operations described above may be performed on a user device (e.g., mobile device 622 or mobile device 624), in a cloud system, or using a combination of both. Thus, some operations may be performed on a user device and some operations may be performed in the cloud. Mobile device 622 and or mobile device 624 may be user devices associated with users (e.g., smartphones, electronic tablets, etc.).

At 702, interface configuration system 102 receives a request to display application data to a user of an application. For example, interface configuration system 102 may receive the request from mobile device 622, mobile device 624 or from one of cloud components 610. When the request is received from a user device, the request may be processed locally. However, when the request is received from one of cloud components 610, the request may be processed in the cloud. In some embodiments, the request may be processed by the combination of cloud components 610 and a mobile device 622 or mobile device 624.

At 704, interface configuration system 102 retrieves a user token associated with the user. For example, interface configuration system 102 may retrieve the user token from mobile device 622, mobile device 624 or from one of cloud components 610. For example, interface configuration system 102 may reside on a user device and may retrieve the user token from local storage. Interface configuration system 102 may also retrieve the user token from one of cloud components 610. In another example, interface configuration system 102 may reside on one of cloud components 610 and may retrieve the user token from within the cloud.

At 706, interface configuration system 102 merges the application token and the user token into a consolidated token. For example, interface configuration system 102 may perform the merge operation on mobile device 622, mobile device 624 or on one of cloud components 610. For example, interface configuration system 102 may reside on a user device and may perform the merge operation on the user device. Interface configuration system 102 may perform the merge operation on one of cloud components 610. In another example, interface configuration system 102 may reside on one of cloud components 610 and may perform the merge operation within the cloud.

At 708, interface configuration system 102 inputs the consolidated token into a machine learning model to obtain a user interface token. For example, interface configuration system 102 may perform the input operation on mobile device 622, mobile device 624 or on one of cloud components 610. For example, interface configuration system 102 may reside on a user device and may perform the input operation on the user device. Interface configuration system 102 may perform the input operation on one of cloud components 610, for example, when the machine learning model resides in the cloud. In some embodiments, interface configuration system 102 may use an API call to the machine learning model in the cloud as part of this operation.

At 710, interface configuration system 102 sends a command to the application to display the application data in a user interface using the user interface token. For example, interface configuration system 102 may send the command locally on mobile device 622, mobile device 624 or from one of cloud components 610. For example, interface configuration system 102 may reside on a user device and may send the command through a system bus or another suitable interface. Interface configuration system 102 may send the command from one of cloud components 610, for example, when the machine learning model resides in the cloud.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

Figure 8:
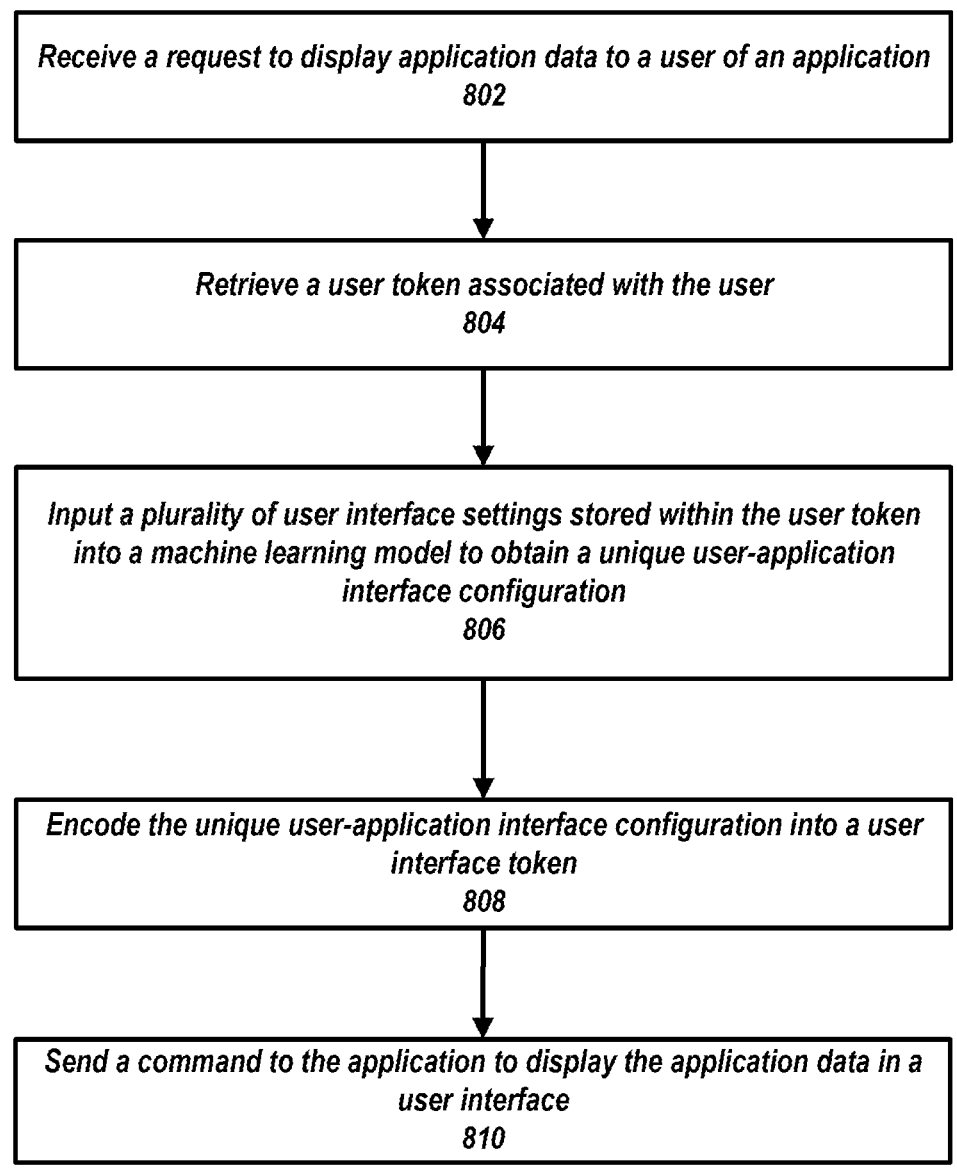
FIG. 8 shows a flowchart of operations for providing pre-defined unique user-application interface configurations using artificial intelligence, in accordance with one or more embodiments.

FIG. 8 shows a flowchart of operations for providing pre-defined unique user-application interface configurations using artificial intelligence. For example, the system may use process 800 (e.g., as implemented on one or more system components described above (e.g., in FIGS. 1 and 6)) in order to provide user interfaces using artificial intelligence. The operations described above may be performed on a user device (e.g., mobile device 622 or mobile device 624), in a cloud system, or using a combination of both. Thus, some operations may be performed on a user device, and some operations may be performed in the cloud. Mobile device 622 and/or mobile device 624 may be user devices associated with users (e.g., smartphones, electronic tablets, etc.).

In some embodiments, interface configuration system 102 may perform the following operations for providing user interfaces using artificial intelligence. At 802, interface configuration system 102 receives a request to display application data to a user of an application. Interface configuration system 102 may receive the request at a user device executing the application. In some embodiments, communication subsystem 112 may receive the request from an application of applications 108*a*-108*n*. Applications 108a-108n may be applications being hosted on a client device that includes user interface components (e.g., graphical user interface components, audio interface components, etc.).

At 804, interface configuration system 102 retrieves a user token associated with the user. In some embodiments, the user token may include a plurality of user configurations generated based on user interface data received from a plurality of sources. For example, as described above, the user token may be a data structure that includes various user interface configurations generated for the user. The data structure may store user interface configurations as name-value pairs. In some embodiments, token generation subsystem 116 may generate the user token using a machine learning model (e.g., as described above). The machine learning model may take, as input, various interface elements preferred by the user or otherwise collected and output the user token (or data for the user token) based on the interface elements. Various components of the user token have been described above.

In some embodiments, user interface settings are encoded into the user token using an encoding algorithm. For example, the user token may include the user interface settings encoded into the vector space of the machine learning model. The user interface settings may include a multitude of name-value pairs. As described above, machine learning subsystem 114 may encode the name-value pairs into a vector within the vector space of a machine learning model that may then be stored as a user token. The encoding may be a reversible encoding, which may enable a user device to encode and decode the vector. For example, the user interface settings encoded into the vector space of the machine learning model may be decoded back into clear text. That is, the encoding may be reversed. Accordingly, machine learning subsystem 114 may decode the user token into the plurality of user interface settings. In some embodiments, the plurality of user interface settings may be user interface settings available within the application. Thus, machine learning subsystem 114 may determine which settings within the application are modifiable and which are not. Furthermore, machine learning subsystem 114 may remove unmodifiable settings from the user interface settings before proceeding with other operations.

At 806, interface configuration system 102 inputs a plurality of user interface settings stored within the user token into a machine learning model to obtain a unique user-application interface configuration. For example, when the request is received, interface configuration system 102 may extract, from the user token, a plurality of user interface settings stored within the user token and input those user interface settings into a machine learning model to obtain a unique user-application interface configuration from the machine learning model. The unique user-application interface configuration may be one of a plurality of pre-defined unique user-application interfaces. The machine learning model may be a machine learning model described in relation to FIG. 5.

Figure 9:
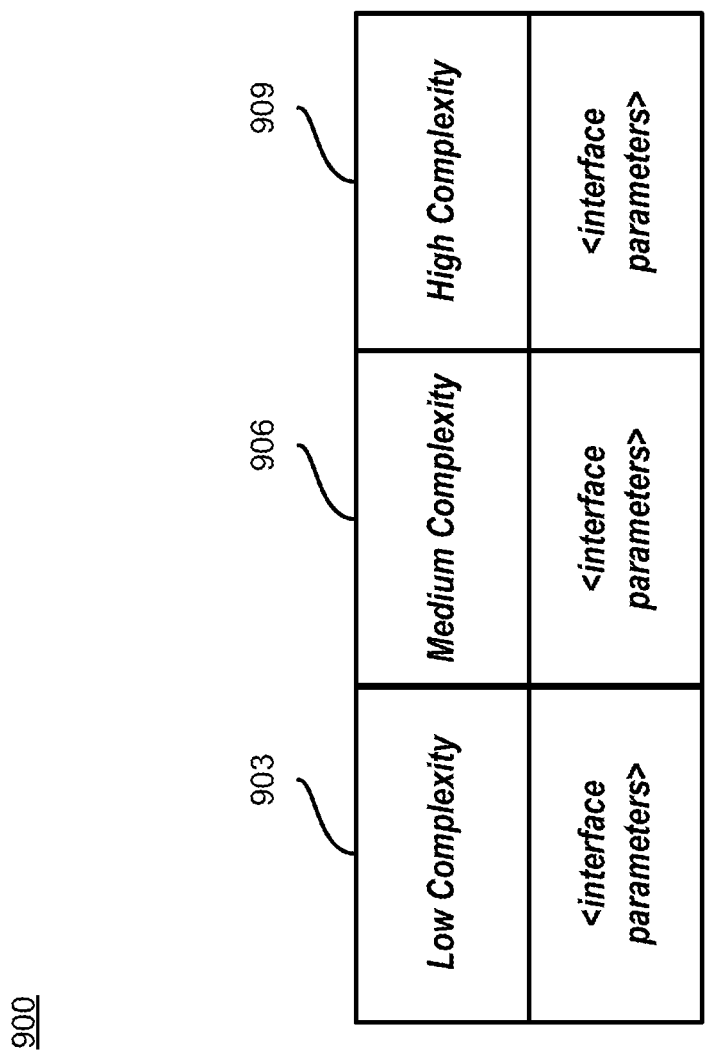
FIG. 9 illustrates exemplary unique user-application interface configurations, in accordance with one or more embodiments.

In some embodiments, the machine learning model may be trained to generate a corresponding unique user-application interface configuration of a plurality of unique user-application interface configurations based on a corresponding plurality of user interface settings. The plurality of unique user-application interface configurations may include a plurality of pre-defined configurations. FIG. 9 illustrates a data structure 900 storing exemplary unique user-application interface configurations. Data structure 900 includes three different configurations and associated interface parameters or user interface settings. Field 903 includes interface parameters for low complexity user interfaces, while field 906 includes interface parameters for medium complexity user interfaces. Field 909 includes interface parameters for high complexity user interfaces. Although FIG. 9 illustrates a complexity classification, other classifications may be used. That is, a corresponding machine learning model may be trained for a particular set of categories, as described above.

In some embodiments, a machine learning model may be trained on a per-application basis, or multiple machine learning models may be trained such that a single machine learning model may differentiate predictions based on application names or application types. In particular, machine learning subsystem 114 may receive a plurality of training datasets. Each training dataset may be associated with a corresponding application. For example, interface configuration system 102 may collect interface interaction data from user devices hosting applications (e.g., applications 108a-108n). The data may be anonymized for security considerations and then may be stored as training data. Each dataset may store training data for a particular application. Machine learning subsystem 114 may then train the machine learning model (or multiple machine learning models) using the plurality of training datasets to obtain unique user-application interface configurations based on application training data and user data within the plurality of training datasets.

In some embodiments, interface configuration system 102 may classify users to pre-determined sets of user interface configuration settings based on various criteria. For example, users may be classified based on complexity, with some users preferring or requiring less complex user interfaces and other users preferring or requiring more complex user interfaces. In another example, users may be classified based on any mental conditions they may have. In some embodiments, interface configuration system 102 may classify users based on multiple criteria and later merge the user interface settings to satisfy multiple criteria.

As discussed above, users may be classified into different categories. Accordingly, the plurality of pre-defined unique user-application interfaces may include different unique user-application interfaces classified by complexity. That is, users may be classified into pre-defined unique user-application interface categories such that some users may be predicted to prefer or require low complexity user interfaces, some users may be predicted to prefer or require medium complexity user interfaces, and some users may be predicted to prefer or require high complexity user interfaces. It should be noted that fewer or more categories may be generated based on machine learning model training. In some embodiments, proficiency may be quantified based on specific user interactions with an interface. For example, machine learning subsystem 114 may use metrics such as completed tasks, errors made, and or steps/actions taken to determine proficiency. One example may be determining a number of clicks a user has taken to navigate to a particular display versus a minimum number of clicks it may take a proficient user to navigate to the same display. In another example, machine learning subsystem 114 may track a number of mistakes/errors a user made when navigating. A mistake or an error may be determined when a click or a selection is detected and then the user navigates back from that selection.

To classify the users into the complexity categories, the machine learning model may be trained based on a training dataset that includes complexity as a target feature and other features that inform the target feature. For example, those features may be a number of interface operations (e.g., clicks, letter inputs, selection inputs, etc.) that it took the user to perform a particular task versus the minimum number of interface operations required for that task. Another example may include an amount of time for the user to perform a particular task versus a minimum amount of time for performing that task. In particular, machine learning subsystem 114 may receive a training dataset that includes user data for a plurality of users. The user data may include user proficiency data associated with one or more user interfaces. For example, user proficiency data may be data described above as related complexity of a user interface and how well or not well a user is able to navigate a user interface of a particular complexity. Machine learning subsystem 114 may train the machine learning model using the training dataset to obtain unique user-application interface configurations based on the user proficiency data. For example, machine learning subsystem 114 may input the training dataset into a training routine of the machine learning model indicating which feature is the target feature.

When machine learning subsystem 114 receives a particular pre-defined unique user-application interface configuration prediction from the machine learning model, machine learning subsystem 114 may process the prediction to update a user interface for a corresponding application. Thus, at 808, interface configuration system 102 encodes the unique user-application interface configuration into a user interface token. As discussed above, interface configuration system 102 may use the user interface token to cause the application to configure its own user interface. For example, interface configuration system 102 may retrieve interface parameters or user interface settings (e.g., as illustrated in FIG. 9) and encode those into a user interface token (e.g., into a data structure that may be used by the application to configure the user interface for the application).

Figure 10:
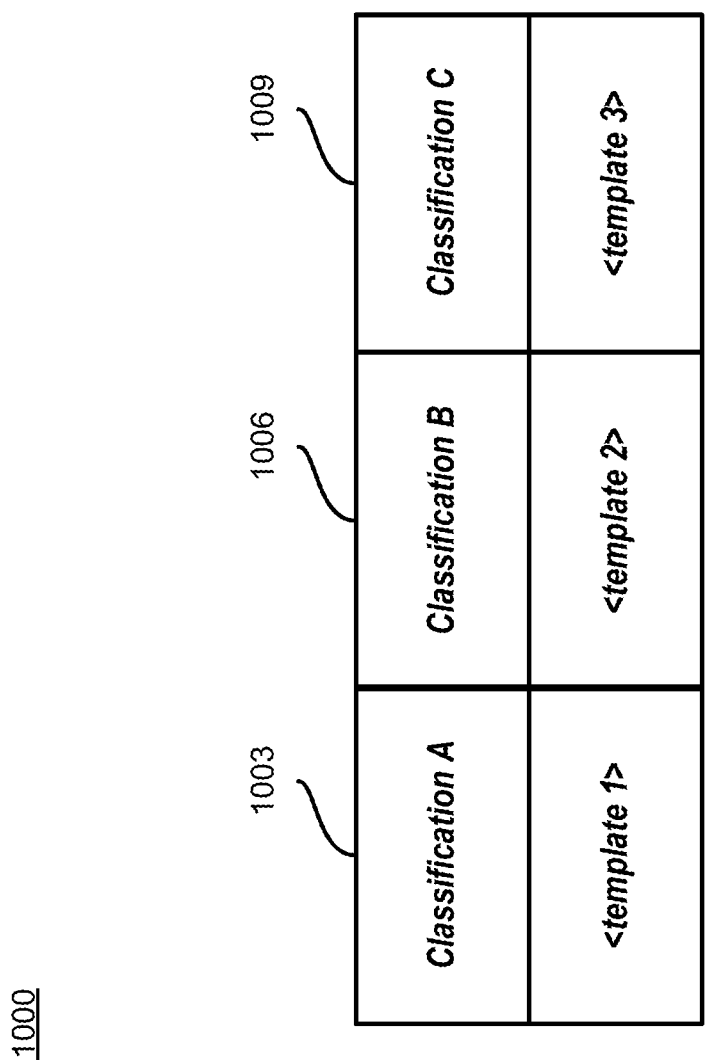
FIG. 10 illustrates a data structure for storing classification and corresponding templates, in accordance with one or more embodiments.

In some embodiments, interface configuration system 102 (e.g., via token generation subsystem 116) may use templates to generate user interface tokens. In particular, token generation subsystem 116 may encode the unique user-application interface configuration into the user interface token by encoding, based on a template of a plurality of templates, the unique user-application interface configuration into the user interface token. The template may be associated with a pre-defined configuration of a plurality of pre-defined configurations. FIG. 10 illustrates a data structure 1000 for storing classification (e.g., as received from the machine learning model) and corresponding templates. Field 1003 may store one classification that may correspond to a particular pre-defined unique user-application interface configuration, while field 1006 may store a different pre-defined unique user-application interface configuration, with field 1009 storing yet another pre-defined unique user-application interface configuration. Classifications in the three fields may be mutually exclusive such that the machine learning model may output one of the classifications as a predicted classification.

In some embodiments, token generation subsystem 116 may perform the following operations when encoding, based on the template of the plurality of templates, the unique user-application interface configuration into the user interface token. Token generation subsystem 116 may retrieve one or more of color scheme configuration, font configuration, layout configuration, or accessibility configuration from the unique user-application interface configuration. For example, token generation subsystem 116 may retrieve the data from interface parameters or user interface settings, as illustrated in FIG. 9. In some embodiments, those parameters may be retrieved from another location (e.g., from a database).

Token generation subsystem 116 may then merge the one or more of the color scheme configuration, the font configuration, the layout configuration, or the accessibility configuration into the template. For example, token generation subsystem 116 may retrieve a template corresponding to a received prediction from the machine learning model and determine which user interface parameters are supported by the template (e.g., can be added to the template) and which parameters are not supported by the template (e.g., cannot be added to the template). Based on the determination, token generation subsystem 116 may add the user interface parameters to the template. In some embodiments, each classification (e.g., as shown in FIG. 10) may include different templates for different applications. For example, different applications may support changes to different interface parameters. A first application may support updating the background color, while a second application may not support updating the background color. Thus, the template for the first application may take as input a background color, while the template for the second application may not support an update to the background color.

At 810, interface configuration system 102 sends a command to the application to display the application data in a user interface using the user interface token. In some embodiments, user interface configuration system 102 (e.g., via communication subsystem 112) may send a command to the application to display, using the user interface token, the application data in a user interface. The command may cause the application to initialize the user interface with the unique user-application interface configuration. For example, the interface configuration system may send a command to the application such that the command may include the user interface token. Thus, the command may cause the application to overwrite its own user interface settings with the settings provided in the user interface token.

In some embodiments, interface configuration system 102 may perform the following operations when sending the command to the application to display the application data in the user interface using the user interface token. That is, interface configuration system 102 may provide, to a user, a menu enabling the user to choose a user interface for the application, of which interface configuration system 102 may generate instructions for displaying, on a new user interface, a user interface element for selecting configurations. The user interface element may include a plurality of predefined unique user-application interface configurations, with the unique user-application interface configuration preselected. For example, the interface configuration system may display a menu for the user to choose a particular pre-determined user-application interface configuration. In some embodiments, the pre-determined user-application interface configurations may be ranked according to output of the machine learning model such that the likeliest menu item is more prominent than the other menu items. Interface configuration system 102 may then add the instructions to the command.

In some embodiments, interface configuration system 102 may continue to improve user interface selections for a particular user in an interface complexity embodiment. Thus, interface configuration system 102 may monitor user interactions with the user interface associated with the application. Monitoring the user interactions may include recording user navigation data, completed action data, and completion timing data. For example, interface configuration system 102 may monitor the interaction on a user device and keep the data on the device for privacy considerations. In some embodiments, the interactions may be quantified based on particular metrics or parameters. For example, these parameters may include click counts, time on page, actions, etc. That data may be recorded and used in the training process of one or more machine learning models. Furthermore, other training paradigms/models may be used. For example, accessibility, visual needs, condition levels, and other parameters may be taken into account when training such models.

Interface configuration system 102 may then input the user navigation data, the completed action data, and the completion timing data into an interface update machine learning model to obtain a performance score for the user interface. The machine learning model is trained to determine performance of different user interfaces in relation to users. In some embodiments, the machine learning model may reside on the user device. However, in some embodiments, the machine learning model may reside on a server system such that the user data may be sent to that server system.

Based on determining that the performance score is below a performance threshold, interface configuration system 102 may input the user navigation data, the completed action data, the completion timing data, and the unique user-application interface configuration into a configuration update machine learning model to obtain a new unique user-application interface configuration. That is, interface configuration system 102 may retrain or update the weights of the machine learning model based on the data collected from the user. This data may be given more weight in the retraining routine based on the data being associated with the user, unlike the original training data.

The present techniques will be better understood with reference to the following enumerated embodiments:

1. A method, the method comprising receiving a request to display application data to a user of an application, wherein the request comprises an application token, the application token comprising a plurality of interface configurations for the application; retrieving a user token associated with the user, wherein the user token comprises a plurality of user configurations generated based on user interface data received from a plurality of sources; merging the application token and the user token into a consolidated token, wherein the consolidated token comprises a first subset of the user interface data and a second subset of the plurality of interface configurations; and inputting the consolidated token into a machine learning model to obtain a user interface token, wherein the machine learning model is trained to generate user interface tokens comprising unique user-application interface configurations; and sending a command to the application to display the application data in a user interface using the user interface token, wherein the command causes the application to initialize the user interface with a unique user-application interface configuration.

2. The method of any one of the preceding embodiments, further comprising: generating a settings request for the application, wherein the settings request requests the plurality of interface configurations for the application; receiving, in response to the settings request, the plurality of interface configurations for the application; encoding the plurality of interface configurations into a vector within a vector space of the machine learning model; and generating the application token from the vector.

3. The method of any one of the preceding embodiments, wherein encoding the plurality of interface configurations into the vector within the vector space of the machine learning model comprises: retrieving a plurality of fields corresponding to available interface configurations; matching each interface configuration of the plurality of interface configurations to a corresponding field of the plurality of fields; and encoding the plurality of interface configurations into the vector according to the plurality of fields, wherein predetermined values are added to fields that are not modifiable.

4. The method of any one of the preceding embodiments, wherein merging the application token and the user token into the consolidated token further comprises: iterating through each user interface configuration of the application token to determine a type associated with each user interface configuration; determining, within the user token, a corresponding user configuration that matches each type; adding user interface configurations that have matching user configurations to the consolidated token; and encoding the consolidated token into a vector within a vector space of the machine learning model.

5. The method of any one of the preceding embodiments, further comprising: receiving, from the machine learning model, the user interface token, wherein the user interface token comprises an output vector within a vector space of the machine learning model; decoding the output vector into a plurality of fields storing interface configuration settings, wherein the plurality of fields corresponds to a plurality of types; and generating the unique user-application interface configuration from the plurality of fields.

6. The method of any one of the preceding embodiments, wherein generating the unique user-application interface configuration from the plurality of fields comprises: retrieving a user interface configuration template of a plurality of user interface configuration templates, wherein the user interface configuration template is associated with the application; and matching, based on the plurality of types, the plurality of fields storing the interface configuration settings with a plurality of template fields to generate the unique user-application interface configuration.

7. The method of any one of the preceding embodiments, further comprising: receiving a first plurality of sets of user interface settings for a plurality of applications, wherein each set of the first plurality of sets has been configured by a corresponding user of a plurality of users; determining a plurality of environmental conditions associated with each set of user interface settings, wherein the plurality of environmental conditions comprises time of day, user location, and temperature at the user location at the time of day; retrieving a second plurality of sets of user characteristics, wherein each set of user characteristics is associated with the corresponding user of the plurality of users; generating a training dataset comprising the first plurality of sets of the user interface settings, the plurality of environmental conditions, and the second plurality of sets of the user characteristics; and inputting the training dataset into a training routine of the user token generation machine learning model to train the user token generation machine learning model to output user tokens, wherein each user token corresponds to a matching plurality of sets of user interface settings.

8. The method of any one of the preceding embodiments, further comprising: retrieving a user identifier of the user; determining, based on the user identifier, that the user token for the user has not been generated yet; determining a plurality of current environmental conditions and a set of user characteristics for the user; inputting the plurality of current environmental conditions and the set of user characteristics into the user token generation machine learning model to obtain a corresponding plurality of user interface settings; and generating the user token based on the corresponding plurality of user interface settings.

9. The method of any one of the preceding embodiments, further comprising: determining that the user token for the user has not been generated yet; retrieving a set of user characteristics for the user; inputting the user characteristics into a similarity model to identify a similar user within a set of users having corresponding user tokens; and generating the user token based on a matching user token associated with the similar user.

10. The method of any one of the preceding embodiments, further comprising: receiving, from the application, a message indicating that the user updated one or more user interface settings, wherein the message comprises indications of the one or more user interface settings; inputting the one or more user interface settings into a user token generation machine learning model to obtain an updated plurality of user interface settings; and generating an updated user token based on the updated plurality of user interface settings.

11. The method of any one of the preceding embodiments, further comprising: determining that the application token comprises a first hierarchy of settings, wherein the first hierarchy of settings comprises a first plurality of levels of detail for the plurality of interface configurations; determining that the user token comprises a second hierarchy of settings, wherein the second hierarchy of settings comprises a second plurality of levels of detail for the plurality of user configurations, and wherein the second plurality of levels has more levels than the first plurality of levels; and updating the user token to remove one or more levels to match the first plurality of levels of detail.

12. A tangible, non-transitory, computer-readable medium storing instructions that, when executed by a data processing apparatus, cause the data processing apparatus to perform operations comprising those of any of embodiments 1-11.

13. A system comprising one or more processors; and memory storing instructions that, when executed by the processors, cause the processors to effectuate operations comprising those of any of embodiments 1-11.

14. A system comprising means for performing any of embodiments 1-11.

Additional present techniques will be better understood with reference to the following enumerated embodiments:
1. A method, the method comprising: receiving a request to display application data to a user of an application; retrieving a user token associated with the user, wherein the user token comprises a plurality of user configurations generated based on user interface data received from a plurality of sources; inputting a plurality of user interface settings stored within the user token into a machine learning model to obtain a unique user-application interface configuration of a plurality of pre-defined unique user-application interfaces; encoding the unique user-application interface configuration into a user interface token; and sending a command to the application to display the application data in a user interface using the user interface token, wherein the command causes the application to initialize the user interface with the unique user-application interface configuration.
2. The method of any one of the preceding embodiments, further comprising decoding the user token into the plurality of user interface settings, wherein the plurality of user interface settings is available within the application.
3. The method of any one of the preceding embodiments, wherein the machine learning model is trained to generate a corresponding unique user-application interface configuration of a plurality of unique user-application interface configurations based on a corresponding plurality of user interface settings, and wherein the plurality of unique user-application interface configurations comprises a plurality of pre-defined configurations.
4. The method of any one of the preceding embodiments, further comprising: receiving a plurality of training datasets, wherein each training dataset is associated with a corresponding application; and training the machine learning model using the plurality of training datasets to obtain unique user-application interface configurations based on application training data and user data within the plurality of training datasets.
5. The method of any one of the preceding embodiments, wherein the plurality of pre-defined unique user-application interfaces comprises different unique user-application interfaces classified by complexity.
6. The method of any one of the preceding embodiments, further comprising: receiving a training dataset comprising user data for a plurality of users, wherein the user data comprises user proficiency data associated with one or more user interfaces; and training the machine learning model using the training dataset to obtain unique user-application interface configurations based on the user proficiency data.
7. The method of any one of the preceding embodiments, wherein encoding the unique user-application interface configuration into the user interface token comprises encoding, based on a template of a plurality of templates, the unique user-application interface configuration into the user interface token, wherein the template is associated with a pre-defined configuration of a plurality of pre-defined configurations.
8. The method of any one of the preceding embodiments, wherein encoding, based on the template of the plurality of templates, the unique user-application interface configuration into the user interface token comprises: retrieving one or more of color scheme configuration, font configuration, layout configuration, or accessibility configuration from the unique user-application interface configuration; and merging the one or more of the color scheme configuration, the font configuration, the layout configuration, or the accessibility configuration into the template.
9. The method of any one of the preceding embodiments, wherein sending the command to the application to display the application data in the user interface using the user interface token comprises: generating instructions for displaying, on a new user interface, a user interface element for selecting configurations, wherein the component configurations associated with the unique user-application interface configuration are pre-selected; and adding the instructions to the command.
10. The method of any one of the preceding embodiments, further comprising: monitoring user interactions with the user interface associated with the application, wherein monitoring comprises recording user navigation data, completed action data, and completion timing data; inputting the user navigation data, the completed action data, and the completion timing data into an interface update machine learning model to obtain a performance score for the user interface, wherein the machine learning model is trained to determine performance of different user interfaces in relation to users; and based determining that the performance score is below a performance threshold, inputting the user navigation data, the completed action data, the completion timing data, and the unique user-application interface configuration into a configuration update machine learning model to obtain a new unique user-application interface configuration.

11. A tangible, non-transitory, computer-readable medium storing instructions that, when executed by a data processing apparatus, cause the data processing apparatus to perform operations comprising those of any of embodiments 1-10.

12. A system comprising one or more processors; and memory storing instructions that, when executed by the processors, cause the processors to effectuate operations comprising those of any of embodiments 1-10.

13. A system comprising means for performing any of embodiments 1-10.

What is claimed is:

1. A system for providing user interfaces using artificial intelligence, the system comprising:
   one or more processors; and
   one or more memories configured to store instructions that when executed by the one or more processors perform operations comprising:
     receiving a request to display application data to a user of a first application;
     retrieving a user token associated with the user, wherein the user token comprises a plurality of user configurations associated with a second application;
     decoding the user token into a plurality of user interface settings associated with the second application;
     inputting the plurality of user interface settings into a machine learning model to obtain a unique user-application interface configuration for the first application based on user interface settings associated with the second application, wherein the machine learning model is trained to generate a corresponding unique user-application interface configuration of a plurality of unique user-application interface configurations based on a corresponding plurality of user interface settings from a different application;
     encoding the unique user-application interface configuration into a user interface token, wherein the user interface token is associated with a pre-defined configuration of a plurality of pre-defined configurations associated with the first application; and
     sending a command to display the application data in a user interface of the first application using the user interface token, wherein the command causes initialization of the user interface of the first application with the unique user-application interface configuration.

2. A method for providing user interfaces using artificial intelligence, the method comprising:
   receiving a request to display application data of a first application;
   retrieving a user token associated with a user, wherein the user token comprises a plurality of user configurations associated with a second application;
   inputting a plurality of user interface settings stored within the user token into a machine learning model to obtain a unique user-application interface configuration of a plurality of pre-defined unique user-application interfaces, wherein the machine learning model has been trained to predict the unique user-application interfaces for the first application based on user interface settings associated with the second application;
   encoding the unique user-application interface configuration into a user interface token associated with the first application;
   generating instructions for displaying a user interface element for selecting configurations, wherein the user interface element comprises a plurality of pre-defined unique user-application interface configurations; and
   sending a command to display the application data in a user interface of the first application using the user interface token, wherein the instructions are added to the command, and wherein the command causes initialization of the user interface of the first application with the unique user-application interface configuration.

3. The method of claim 2, further comprising decoding the user token into the plurality of user interface settings, wherein the plurality of user interface settings is available within an application.

4. The method of claim 2, wherein the machine learning model is trained to generate a corresponding unique user-application interface configuration of a plurality of unique user-application interface configurations based on a corresponding plurality of user interface settings, and wherein the plurality of unique user-application interface configurations comprises a plurality of pre-defined configurations.

5. The method of claim 2, further comprising:
   receiving a plurality of training datasets, wherein each training dataset is associated with a corresponding application; and
   training the machine learning model using the plurality of training datasets to obtain unique user-application interface configurations based on application training data and user data within the plurality of training datasets.

6. The method of claim 2, wherein the plurality of pre-defined unique user-application interfaces comprises different unique user-application interfaces classified by complexity.

7. The method of claim 6, further comprising:
   receiving a training dataset comprising user data for a plurality of users, wherein the user data comprises user proficiency data associated with one or more user interfaces; and
   training the machine learning model using the training dataset to obtain unique user-application interface configurations based on the user proficiency data.

8. The method of claim 2, wherein encoding the unique user-application interface configuration into the user interface token comprises encoding, based on a template of a plurality of templates, the unique user-application interface configuration into the user interface token, wherein the template is associated with a pre-defined configuration of a plurality of pre-defined configurations.

9. The method of claim 8, wherein encoding, based on the template of the plurality of templates, the unique user-application interface configuration into the user interface token comprises:
   retrieving one or more of color scheme configuration, font configuration, layout configuration, or accessibility configuration from the unique user-application interface configuration; and
   merging the one or more of the color scheme configuration, the font configuration, the layout configuration, or the accessibility configuration into the template.

10. The method of claim 2, further comprising:
    monitoring user interactions with the user interface associated with an application, wherein monitoring comprises recording user navigation data, completed action data, and completion timing data;
    inputting the user navigation data, the completed action data, and the completion timing data into an interface update machine learning model to obtain a performance score for the user interface, wherein the machine learning model is trained to determine performance of different user interfaces in relation to users; and based determining that the performance score is below a performance threshold, inputting the user navigation data, the completed action data, the completion timing data, and the unique user-application interface configuration into a configuration update machine learning model to obtain a new unique user-application interface configuration.

11. One or more non-transitory, computer-readable media for providing user interfaces using artificial intelligence, storing instructions thereon that cause one or more processors to perform operations comprising:

receiving a request to display application data of a first application;

retrieving a user token associated with a user, wherein the user token comprises a plurality of user configurations associated with a second application;

inputting a plurality of user interface settings stored within the user token into a machine learning model to obtain a unique user-application interface configuration of a plurality of pre-defined unique user-application interfaces, wherein the machine learning model has been trained to predict the unique user-application interfaces for the first application based on user interface settings associated with the second application;

encoding the unique user-application interface configuration into a user interface token associated with the first application;

generating instructions for displaying a user interface element for selecting configurations, wherein the user interface element comprises a plurality of pre-defined unique user-application interface configurations; and sending a command to display the application data in a user interface of the first application using the user interface token, wherein the instructions are added to the command, and wherein the command causes initialization of the user interface of the first application with the unique user-application interface configuration.

12. The one or more non-transitory, computer-readable media of claim 11, wherein the instructions further cause the one or more processors to decode the user token into the plurality of user interface settings, wherein the plurality of user interface settings is available within an application.

13. The one or more non-transitory, computer-readable media of claim 11, wherein the machine learning model is trained to generate a corresponding unique user-application interface configuration of a plurality of unique user-application interface configurations based on a corresponding plurality of user interface settings, and wherein the plurality of unique user-application interface configurations comprises a plurality of pre-defined configurations.

14. The one or more non-transitory, computer-readable media of claim 11, wherein the instructions further cause the one or more processors to perform operations comprising:

receiving a plurality of training datasets, wherein each training dataset is associated with a corresponding application; and training the machine learning model using the plurality of training datasets to obtain unique user-application interface configurations based on application training data and user data within the plurality of training datasets.

15. The one or more non-transitory, computer-readable media of claim 11, wherein the plurality of pre-defined unique user-application interfaces comprises different unique user-application interfaces classified by complexity.

16. The one or more non-transitory, computer-readable media of claim 15, wherein the instructions further cause the one or more processors to perform operations comprising:

receiving a training dataset comprising user data for a plurality of users, wherein the user data comprises user proficiency data associated with one or more user interfaces; and training the machine learning model using the training dataset to obtain unique user-application interface configurations based on the user proficiency data.

17. The one or more non-transitory, computer-readable media of claim 11, wherein the instructions for encoding the unique user-application interface configuration into the user interface token cause the one or more processors to encode, based on a template of a plurality of templates, the unique user-application interface configuration into the user interface token, wherein the template is associated with a pre-defined configuration of a plurality of pre-defined configurations.

18. The one or more non-transitory, computer-readable media of claim 17, wherein the instructions for encoding, based on the template of the plurality of templates, the unique user-application interface configuration into the user interface token cause the one or more processors to perform operations comprising:

retrieving one or more of color scheme configuration, font configuration, layout configuration, or accessibility configuration from the unique user-application interface configuration; and merging the one or more of the color scheme configuration, the font configuration, the layout configuration, or the accessibility configuration into the template.

19. The one or more non-transitory, computer-readable media of claim 11, wherein the instructions further cause the one or more processors to perform operations comprising:

monitoring user interactions with the user interface associated with an application, wherein monitoring comprises recording user navigation data, completed action data, and completion timing data;

inputting the user navigation data, the completed action data, and the completion timing data into an interface update machine learning model to obtain a performance score for the user interface, wherein the machine learning model is trained to determine performance of different user interfaces in relation to users; and based determining that the performance score is below a performance threshold, inputting the user navigation data, the completed action data, the completion timing data, and the unique user-application interface configuration into a configuration update machine learning model to obtain a new unique user-application interface configuration.

20. The one or more non-transitory, computer-readable media of claim 11, wherein the unique user-application interface configuration is pre-selected.

* * * * *